Dec. 25, 1951     E. C. PARDEE     2,579,853
WHEEL MANIPULATING TOOL
Filed May 31, 1950
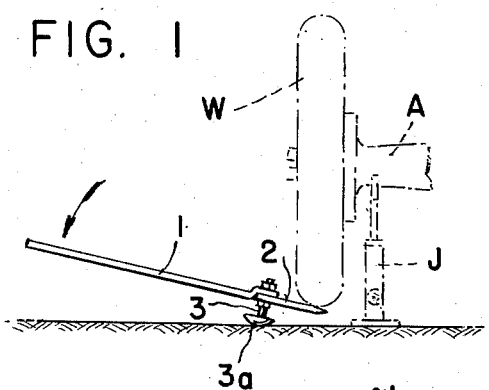
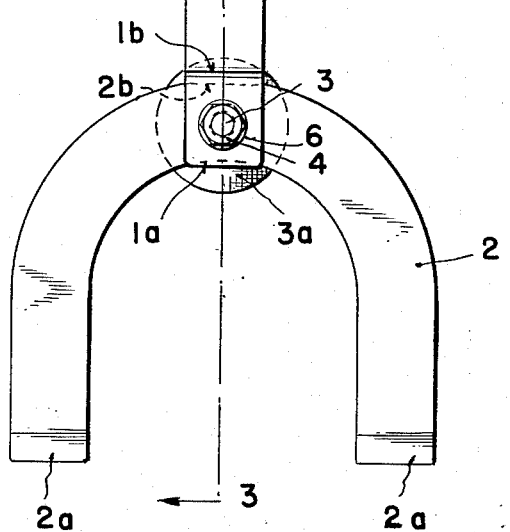
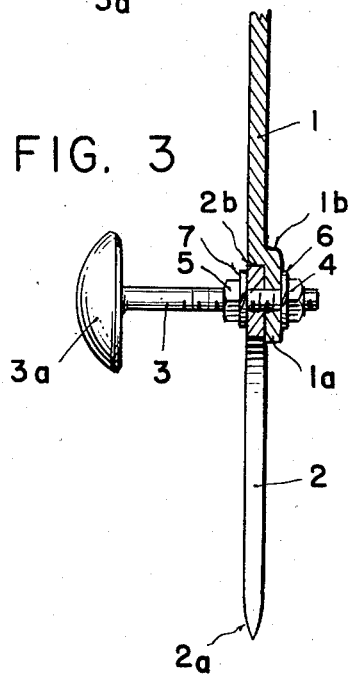
INVENTOR
EDWIN C. PARDEE,
BY *Babcock & Babcock*
ATTORNEYS

Patented Dec. 25, 1951

2,579,853

UNITED STATES PATENT OFFICE 2,579,853

WHEEL MANIPULATING TOOL

Edwin C. Pardee, Tifton, Ga.

Application May 31, 1950, Serial No. 165,326

3 Claims. (Cl. 254—131)

This invention relates to a wheel manipulating tool intended primarily for use in applying a usual pneumatically tired wheel to an automobile or other wheeled vehicle, and capable also of use in prying loose the hub cap preparatory to removal of a wheel.

Such a tool is in the form of a lever of the first class having a medially located depending fulcrum or foot to bear on the road surface, a wheel engaging cradle or portion projecting forwardly from said fulcrum to receive and support the wheel, and an operating handle projecting rearwardly from the fulcrum whereby power may be applied to swing the lever in either a horizontal or vertical direction as desired to properly raise and position the wheel.

Tools of this general type have heretofore been known and used, hence are not claimed broadly as my invention.

It is the primary object of my invention to construct such a tool in separate sections, assembled in a novel and economical manner and which may be compactly stored or shipped in knockdown condition.

An important feature of the invention consists in so forming the several parts or sections that one of the said parts serves a dual function, both as a fulcrum and as the sole connecting or securing means for holding the several parts in rigid assembled relation, thereby greatly simplifying and facilitating the assembly operation.

In this application I show and describe only the preferred embodiment of my invention, simply by way of illustration of the practice thereof, as by law required. However, I recognize that my invention is capable of other and different embodiments and that the several details thereof may be modified in various ways, all without departing from my invention. Accordingly, the drawings herein and the following detailed description of my invention are to be considered as merely illustrative and not as exclusive.

In the accompanying drawings:

Figure 1 represents a small scale side elevation of the preferred embodiment of the invention as it will appear when used in manipulating and positioning a vehicle wheel during the operation of applying the latter to a vehicle, the adjoining axle structure of the vehicle (shown fragmentarily) being supported by a jack in accordance with usual practice;

Figure 2, a plan view of the tool per se, on a larger scale than in Figure 1, the medial portion of the operating handle being broken away; and, Figure 3, a sectional view on the line 3—3 of Figure 2, looking in the direction of the arrows and illustrating in detail the manner in which the several tool parts or elements are assembled.

Referring now in detail to the accompanying drawings, the tool of the invention comprises a rigid elongated operating handle 1, at the forward end of which is rigidly mounted a bifurcated rigid wheel support or cradle, preferably in the form of a U-shaped or horse shoe shaped element 2, the furcations or ends 2a of which project forwardly from the operating handle 1.

In order to provide a simple rigid connection between the elements 1 and 2, the handle 1 is provided at its forward end with an offset connecting portion 1a which joins the main portion of handle 1 along a forwardly presented transverse shoulder or abutment 1b.

A threaded fulcrum bolt 3 passed through registering bores in the handle portion 1a and the cradle 2 secures these two elements in rigid assembled relation, nuts 4 and 5 being turned tight on the bolt 3 to urge or jam said parts 2 and 1a into firm frictional flush engagement. Preferably customary lock washers 6 and 7 will be interposed between the said nuts 4 and 5 and their respective adjacent parts 1a and 2.

It will be noted that a portion 2a of the rear edge of the cradle or member 2 is formed straight, as shown in Figure 2, and lies flush against the straight transverse shoulder or abutment 1b of the handle 1 to prevent relative rotary movement between the parts 1 and 2 about the fulcrum bolt 3.

As clearly shown in Figures 1 and 3, the bolt 3 depends a substantial distance beneath the juncture of elements 1 and 2, terminating at its lower end in an enlarged fulcrum or bearing foot 3a adapted to rest on a supporting surface. Preferably the lower face of the fulcrum 3a is of rounded or generally spherical conformation to facilitate universal rocking or swinging of the lever in its operation.

In the use of the invention, which is believed to be readily apparent from the foregoing, where a wheel is to be applied to a vehicle, the latter is supported by a jack J or other analogous device in conventional manner, as shown in Figure 1. The wheel is rolled to a position opposite the end of the axle A and disposed with its lug holes or bores in substantially the same rotational positions as the lug bolts which will secure it in position. The forward end or cradle 2 of the tool may then be inserted beneath the tire of the wheel W, or alternatively the wheel may be rolled onto the cradle, the cradle having first been positioned opposite the axle end.

Subsequently, downward pressure on the handle 1 may be utilized to rotate the tool about its fulcrum 3a to the extent necessary to raise the wheel W to the proper level. Should it be necessary to move the wheel horizontally to properly position same, this may be accomplished by swinging the handle 1 horizontally about the fulcrum 3a. Should it prove necessary to cause rotary movement or adjustment of the wheel to attain accurate registry between the lug bolts and bores, this may be accomplished to a limited degree by rocking the tool on its fulcrum 3a transversely to the length of the tool. While horizontal or translational movement of the wheel incident to such rocking movement may necessitate a slight readjustment in the horizontal position of the wheel, such horizontal readjustment may be readily performed in the manner aforementioned.

In addition to its primary function as a wheel manipulating tool, my invention may also be advantageously employed in prying off hub caps of wheels preparatory to removal of the latter. To this end it is desirable to provide the prongs or furcations 2a of the cradle 2 with sharpened or wedge shaped forward end edges, as in Figure 3, to facilitate insertion of these beneath the hub caps.

In a tool constructed in accordance with the invention, the handle 1 and wheel cradle portion 2 may be economically formed from heavy sheet metal by usual stamping and bending operations, and if desired may be compactly shipped and stored together with the bolts 3. Said parts may be easily assembled into complete tools by unskilled labor simply by passing the bolts through adjoining portions of the members 1 and 2 and turning the nuts 4 and 5 tight thereon as above mentioned, the same operation securing the fulcrum 3a in rigid operative position relative to the tool.

Having thus described my invention, I claim:

1. A wheel manipulating tool comprising an elongated rigid handle, a portion of said handle at the forward end thereof being offset upwardly from said handle and joined thereto by a relatively transversely extending shoulder, a bifurcated wheel cradle disposed beneath said offset portion and having a linear edge in engagement with said shoulder to prevent relative rotary movement between said handle and cradle, said cradle and said overlapping portion respectively being formed with registering bores, a bolt disposed through said bores and nuts on said bolt maintaining said cradle and handle in assembled relation, said bolt depending from said tool and terminating in an enlarged head having a rounded lower face to provide a universally rockable fulcrum for said tool.

2. A wheel manipulating tool comprising an elongated rigid handle, said handle being provided adjacent its forward end with a forwardly presented linear shoulder, a wheel cradle, a bolt securing said cradle to the forward end of said handle, said cradle having a linear edge engaging said shoulder to prevent rotary movement between said cradle and handle, said bolt depending beneath said tool and terminating in an enlarged ground engaging fulcrum, said fulcrum having a substantially spherical lower face to permit universal rocking of the tool thereon.

3. A wheel manipulating tool comprising an elongated rigid handle, said handle being provided adjacent its forward end with a forwardly presented linear shoulder, a wheel cradle, a bolt securing said wheel cradle to the forward end of said handle, said cradle having a linear edge in engagement with said shoulder to prevent rotary movement between said cradle and said handle, said bolt depending beneath said tool and terminating in an enlarged ground engaging fulcrum.

EDWIN C. PARDEE.

REFERENCES CITED

The following references are of record in the file of this patent:

UNITED STATES PATENTS

| Number | Name | Date |
|---|---|---|
| 1,971,785 | Jersey | Aug. 28, 1934 |

FOREIGN PATENTS

| Number | Country | Date |
|---|---|---|
| 724,557 | France | Apr. 29, 1932 |

OTHER REFERENCES

Popular Science Monthly, June 1930, page 84.